United States Patent
Tanielian

(10) Patent No.: US 9,555,882 B2
(45) Date of Patent: Jan. 31, 2017

(54) AIRBORNE SYSTEM AND METHOD FOR REMOVING POLLUTANTS FROM A VOLUME OF AIR

(71) Applicant: The Boeing Company, Chicago, IL (US)

(72) Inventor: Minas H. Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 78 days.

(21) Appl. No.: 14/673,488

(22) Filed: Mar. 30, 2015

(65) Prior Publication Data

US 2016/0288904 A1    Oct. 6, 2016

(51) Int. Cl.
| | |
|---|---|
| *B01D 46/42* | (2006.01) |
| *B01D 53/74* | (2006.01) |
| *B64C 39/02* | (2006.01) |
| *B01D 53/06* | (2006.01) |
| *B01D 45/08* | (2006.01) |
| *B03C 3/00* | (2006.01) |

(52) U.S. Cl.
CPC ............. *B64C 39/02* (2013.01); *B01D 45/08* (2013.01); *B01D 53/06* (2013.01); *B01D 2253/102* (2013.01); *B01D 2279/40* (2013.01); *B03C 3/00* (2013.01); *B03C 2201/30* (2013.01); *B64C 2201/12* (2013.01)

(58) Field of Classification Search
CPC ..... B01D 46/42; B01D 53/74; B01D 2279/40; B01D 2259/4558
USPC ........ 55/356, 385.1, 385.3; 244/30, 52, 73 R
See application file for complete search history.

(56) References Cited

U.S. PATENT DOCUMENTS

| | | | | |
|---|---|---|---|---|
| 2,468,021 | A * | 4/1949 | Black | G01N 15/0618 55/356 |
| 3,059,470 | A * | 10/1962 | Baldwin | G01N 1/2202 55/422 |
| 3,152,777 | A * | 10/1964 | McLean | B64B 1/00 244/30 |
| 3,825,212 | A * | 7/1974 | Darges | B64D 13/08 236/13 |
| 4,261,534 | A * | 4/1981 | Roselli | B64C 1/34 239/2.1 |
| 4,292,052 | A * | 9/1981 | Cardullo | B01D 46/12 55/314 |
| 4,364,532 | A * | 12/1982 | Stark | B64B 1/00 126/573 |
| 5,147,429 | A * | 9/1992 | Bartholomew | B01D 46/42 244/30 |

OTHER PUBLICATIONS

Wikipedia, "Electrostatic Pecipitator", retrieved Mar. 25, 2015.

* cited by examiner

*Primary Examiner* — Jacob T Minskey
*Assistant Examiner* — Minh-Chau Pham

(57) ABSTRACT

An air filter bank may include a housing configured to be coupled to an exterior of an air vehicle. The housing may have an air intake at a forward end and an air exit at an aft end and defining an air path therebetween. The air filter bank may further include at least one air filter positioned within the housing along the air path. The air filter may be configured to remove pollutants entrained in a volume of air entering the air intake and impinging on the filter surfaces prior to exiting the air exit.

13 Claims, 8 Drawing Sheets

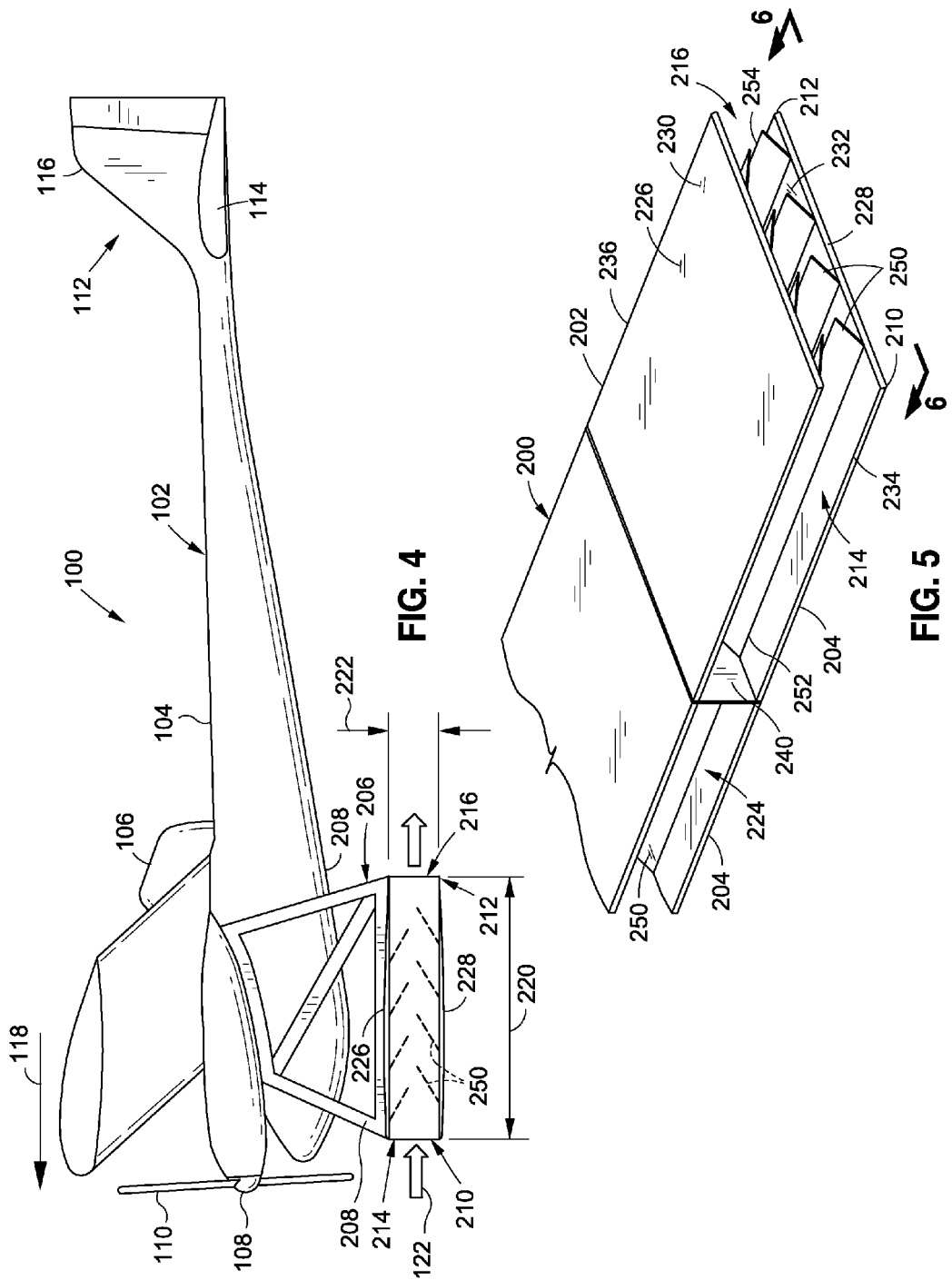

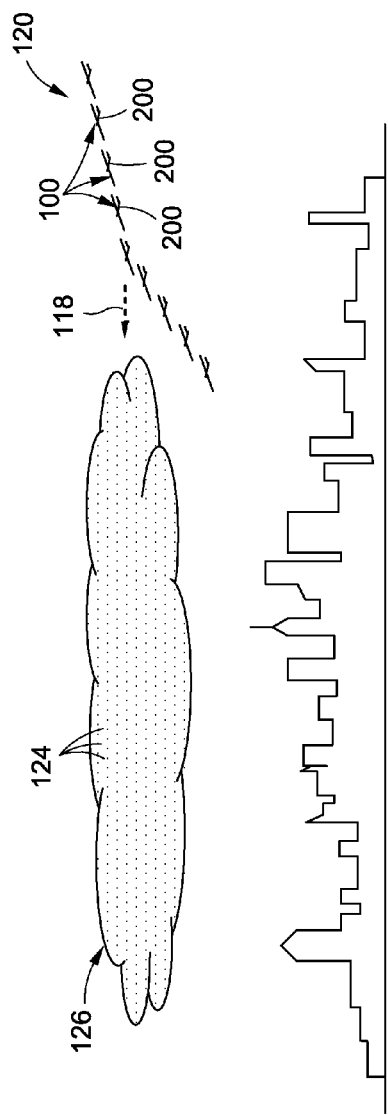
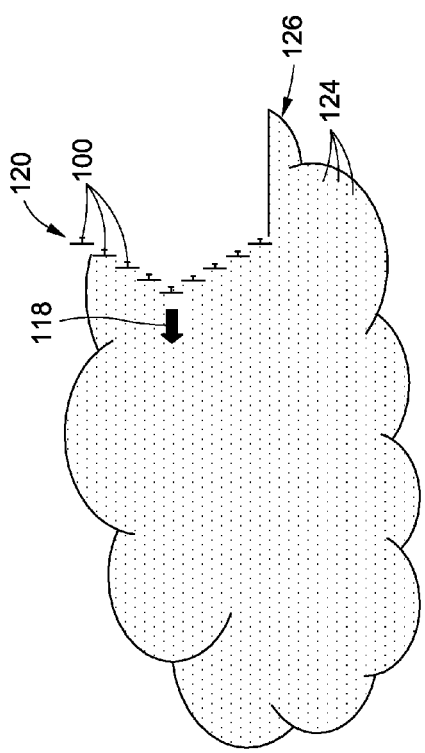

| EXAMPLE | HOUSING HEIGHT (meters) | HOUSING LENGTH (meters) | AREA OF AIR INTAKE (square meters) | VEHICLE SPEED (meters/hr) | FILTERING RATE (cubic meters/hr) | NO. OF HOURS OPERATING |
|---|---|---|---|---|---|---|
| 1 | 3 | 80 | 240 | $7.50 \times 10^4$ | $1.80 \times 10^7$ | 10 |
| 2 | 4 | 100 | 400 | $1.00 \times 10^5$ | $4.00 \times 10^7$ | 12 |

| VOLUME OF AIR (cubic meters) | QTY OF AIR VEHICLES | TOTAL VOLUME OF AIR (cubic meters) | CITY AREA (square meters) | ALTITUDE BAND OF AIR TO BE FILTERED (meters) | VOLUME OF AIR OVER CITY (cubic meters) | % OF VOLUME TREATED |
|---|---|---|---|---|---|---|
| $1.80 \times 10^8$ | 10 | $1.80 \times 10^9$ | $2.25 \times 10^8$ | 500 | $1.13 \times 10^{11}$ | 1.6 |
| $4.80 \times 10^8$ | 20 | $9.60 \times 10^9$ | $2.25 \times 10^8$ | 500 | $1.13 \times 10^{11}$ | 8.53 |

FIG. 12

AIRBORNE SYSTEM AND METHOD FOR REMOVING POLLUTANTS FROM A VOLUME OF AIR

FIELD

The present disclosure relates generally to air filters and, more particularly, to an airborne system and method for removing one or more types of pollutants from air.

BACKGROUND

Air pollution is a significant problem for many major cities. For example, air pollution is responsible for many health conditions in humans including pulmonary irritations, heart disease, and lung cancer. Air pollution can include noxious gasses, liquids, and particulates that enter the atmosphere. Smog is a common form of air pollution and is caused by particulates in the air that act as nucleation centers for water molecules that become large enough to scatter light. Smog can also include oxides of sulfur and nitrogen from the exhaust emissions of motor vehicles.

Current methods for reducing air pollution are directed toward reducing or minimizing sources of air pollution. For example, air quality standards have been enacted setting upper limits on the concentration of certain types of pollutants. Legislation has also been enacted setting standards for minimum levels of fuel efficiency for motor vehicles. Taxes are imposed on manufacturers of new motor vehicles that fail to meet fuel efficiency standards. Environmental agencies have also set limits on emissions from factories, power plants, and other industrial facilities.

Unfortunately, current methods do not address the removal of existing pollutants from the atmosphere. In this regard, smog-producing particulates can remain suspended in the air for a relatively long period of time due to their very small size. Although suspended particulates may eventually be washed to the ground during a precipitation event, certain geographic areas may go for months without rainfall. Furthermore, certain pollutants that are washed to the ground may be harmful to plants and animals.

As can be seen, there exists a need in the art for a system and method for actively removing pollutants from the atmosphere.

BRIEF SUMMARY

The above-described needs associated with the removal of pollutants from the atmosphere are specifically addressed and alleviated by the present disclosure which, in an aspect, provides an air filter bank which may include a housing configured to be coupled to an exterior of an air vehicle. The housing may have an air intake at a forward end and an air exit at an aft end and defining an air path therebetween. The air filter bank may further include at least one air filter positioned within the housing along the air path. The air filter may be configured to remove pollutants entrained in a volume of air entering the air intake and impinging on the filter surfaces prior to exiting the air exit.

In a further aspect, disclosed is an air vehicle including at least one air filter bank coupled to an exterior of the air vehicle. The air filter bank may be operable to remove pollutants from a volume of air passing through the air filter bank during forward motion of the air vehicle.

Also disclosed is a method of manufacturing an air vehicle for removing pollutants from a volume of air. The method may include providing an air filter bank operable to remove pollutants from a volume of air passing through the air filter bank. The method of manufacturing the air vehicle may further include affixing the air filter bank to an exterior of an air vehicle.

In addition, disclosed is a method of removing a pollutant from a volume of air. The method may include moving an air vehicle through the air along a direction of forward motion. The air vehicle may include an air filter bank coupled to an exterior of the air vehicle. The method of removing the pollutant from the volume of air may also include passing a volume of air through the air filter bank when moving the air vehicle through the air. The method may additionally include removing, using the air filters, pollutants from the volume of air.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 4 is a side view of an example of the aircraft taken along line 4 of FIG. 3;

FIG. 5 is a partial perspective view of an example of an air filter bank taken along line 5 of FIG. 2;

FIG. 10 is a side view of an example of a flying formation of air vehicles each having an air filter bank for removing pollutants from the atmosphere above a city;

FIG. 11 is a top view of an example of a flying formation of air vehicles removing pollutants from the atmosphere;

FIG. 12 is a chart listing the approximate dimensions and filtering capability for two examples of an air filter bank that may be carried by a fleet of air vehicles over a city for filtering pollutants from the atmosphere.

DETAILED DESCRIPTION

Figure 1:
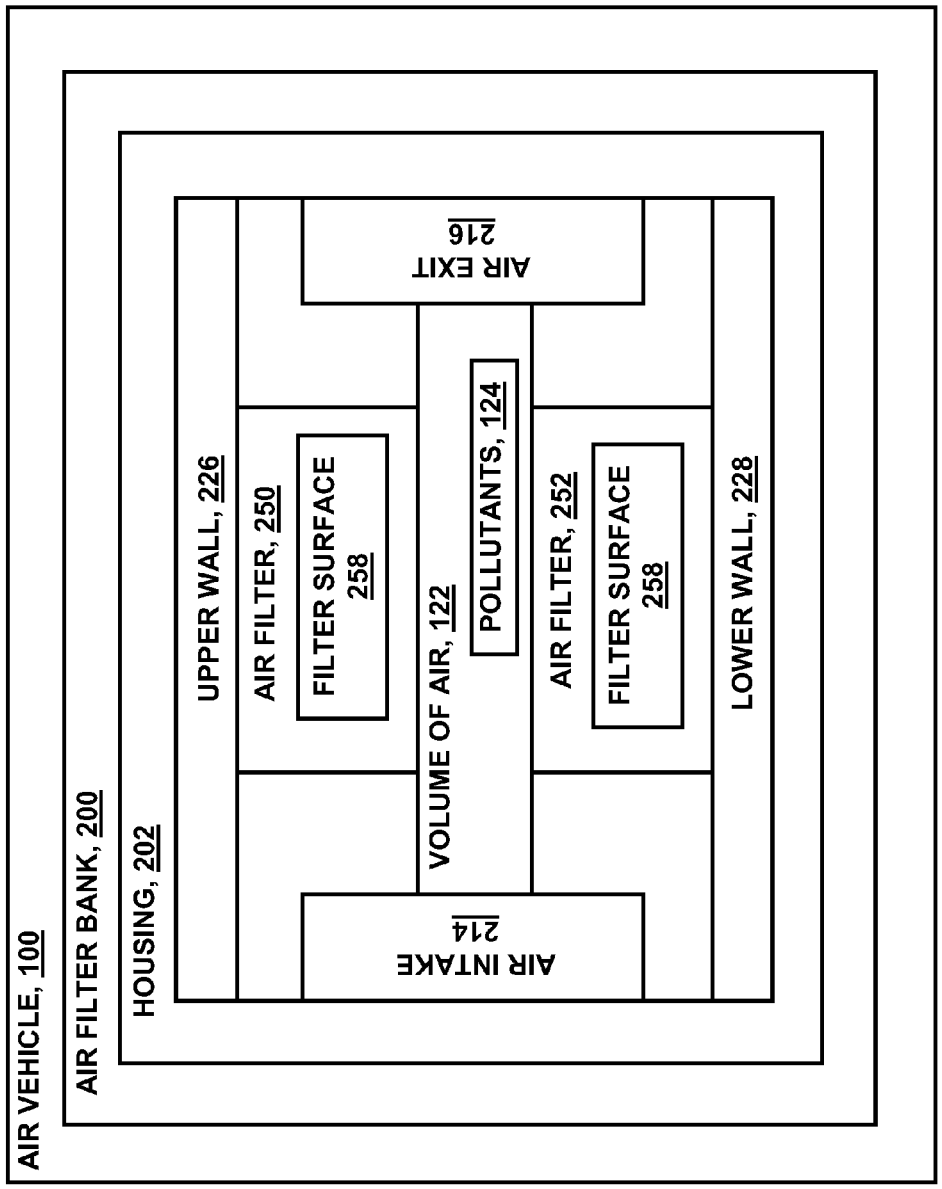
FIG. 1 is a block diagram of an aircraft that may include an air filter bank for removing pollutants from the air.
Figure 2:
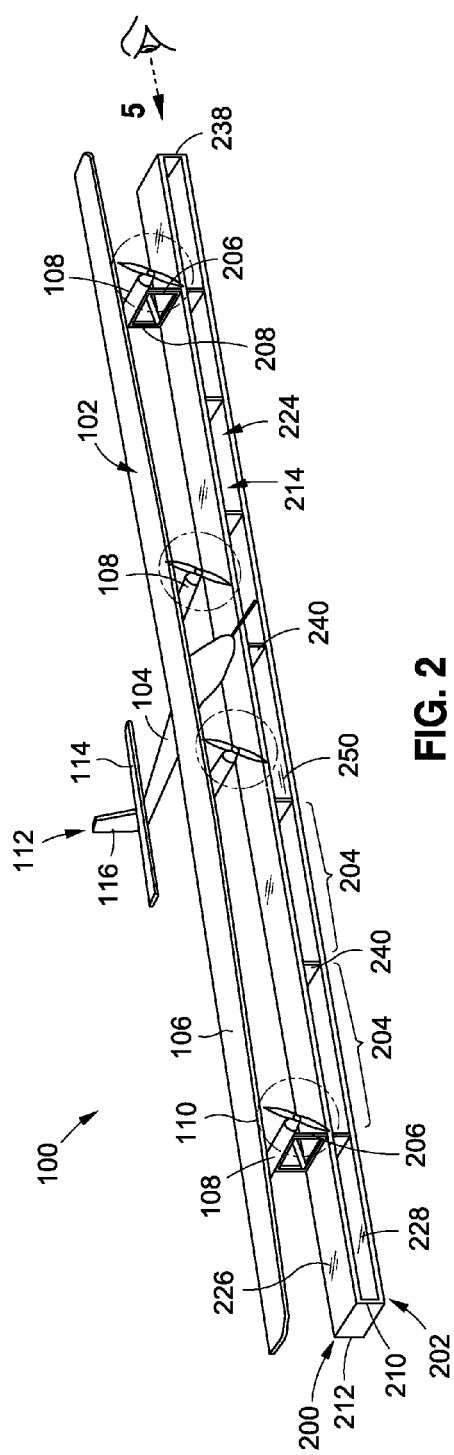
FIG. 2 is a perspective view of an example of an aircraft including an air filter bank

Referring now to the drawings wherein the showings illustrate various examples of the disclosure, shown in FIG. 1 is a block diagram of an air vehicle 100 such as an aircraft 102 including an air filter bank 200 for removing pollutants 124 from the air. The air filter bank 200 may include a housing 202 configured to be coupled to an exterior of the air vehicle 100 at one or more locations. The housing 202 may have a forward end 210 (FIG. 2) and an aft end 212 (FIG. 2). The forward end 210 may include an air intake 214 configured to receive a volume of air 122 from the atmosphere through which the air vehicle 100 is flying. The aft end 212 may include an air exit 216. The housing 202 may include a housing interior 224 (FIG. 2) having an air path 266 (FIG. 6) extending between the forward end 210 and the aft end 212. The air exit 216 may exhaust the volume of air 122 after passing through the housing interior 224.

The air filter bank 200 may include at least one air filter 250 positioned within the housing 202 along the air path 266. In one example, the air filter bank 200 may include a series of air filters 250 arranged in spaced relation to one another along a direction of the air path 266 from the air intake 214 to the air exit 216. The air filters 250 may have one or more filter surfaces 258 protruding into the air path 266. The air filters 250 may be operable or configured to remove pollutants 124 entrained in the volume of air 122 entering the air intake 214 and impinging on the filter surfaces 258 prior to the volume of air 122 exiting the housing 202 at the air exit 216.

FIG. 2 shows a perspective view of an example of an aircraft 102 having an air filter bank 200 suspended below the aircraft 102 and providing an airborne system for removing pollutants 124 from the atmosphere. The aircraft 102 may include a fuselage 104 having a nose at a forward end 210 of the aircraft 102 and an empennage 112 at an aft end of the aircraft 102. The empennage 112 may include a horizontal tail 114 and/or a vertical tail 116 for directional control and stability of the aircraft 102. However, the aircraft 102 may include tail configurations other than a horizontal tail 114 and a vertical tail 116. The aircraft 102 may include one or more wings 106 extending outwardly from the fuselage 104. The aircraft 102 may further include one or more propulsion units 108 which may be mounted a fuselage 104 and/or to the wings 106. In the example of FIG. 2, the propulsion units 108 are shown having a propeller 110.

The propulsion units 108 powered by any one of a variety of different power sources. For example, the propulsion units 108 may be configured as conventional internal combustion engines and/or a gas turbine engines, or the propulsion units 108 may be powered by fuel cells or by solar cells to avoid producing emissions. A rechargeable battery may be included to allow continued operation of the aircraft during periods of low sunlight. In one example, the aircraft 102 may have a plurality of solar cells on the upper surface of the wings 106 and/or the horizontal tail 114 for generating electricity for powering electric motors to drive the propellers 110.

In FIG. 2, the air filter bank 200 may include a housing 202 which may be coupled to the aircraft 102 at one or more locations. The housing 202 may be open on the front end at the air intake 214 and open on the aft end 212 at the air exit 216. The housing interior 224 may define the air path 266 for the passage of a volume of air 122 through the housing interior 224 from the air intake 214 to the air exit 216, as indicated above.

Figure 3:
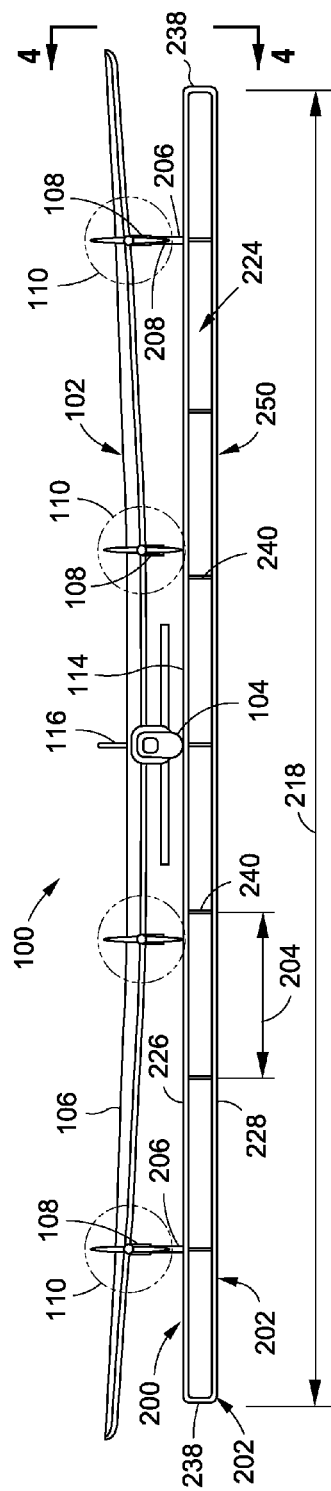
FIG. 3 is a front view of an example of the aircraft of FIG. 2.

FIG. 3 shows a front view of the aircraft 102. In the example shown, the housing 202 may have an upper wall 226 and a lower wall 228 facing the upper wall 226. The housing 202 may also include an end wall 238 on each end of the housing 202, although one or both of the end walls 238 may be omitted. In the example shown, the housing 202 may have a generally rectangular elongated configuration when the housing 202 is viewed along a direction perpendicular to the air intake 214. However, the housing 202 may be provided in any configuration including a curved configuration (not shown). The housing 202 may have a housing length 218 which may be oriented substantially perpendicular to a direction of forward motion 118 of the aircraft 102. In the example shown, the housing length 218 may be slightly less than a wingspan of the wings 106. However, the housing 202 may be provided in any housing length 218.

In FIG. 2-3, the housing length 218 may be divided into two or more housing sections 204. Each housing section 204 may include a divider wall 240 on opposite ends of the housing section 204. A pair of adjacent housing sections 204 may share a common divider wall 240. In other implementations, each housing section 204 may be bounded on opposite ends by a separate divider wall 240. In some examples, two or more housing sections 204 may be assembled end-to-end to form a complete housing 202 which may be attached to an air vehicle 100. An air filter bank 200 may be configured such that any one or more of the housing sections 204 in an end-to-end series of housing sections 204 may be removed and/or replaced.

Although not shown, the housing 202 may include an external frame and/or an integrated frame that may be incorporated into the housing 202 for supporting the housing 202 and/or housing sections 204, and to provide strength and rigidity to the air filter bank 200. The frame may allow housing sections 204 to be removed and replaced without disassembling or separating the end-to-end system of housing sections 204. Each one of the housing sections 204 may include one or more air filters 250 for removing pollutants 124 from the volume of air 122 passing through the housing sections 204.

Figure 6:
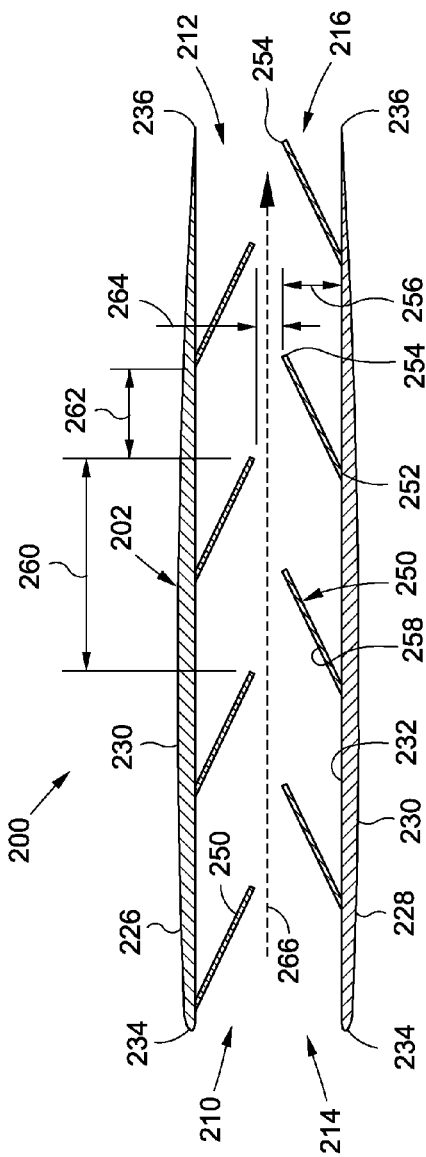
FIG. 6 is a side view of an example of the air filter bank taken along line 6 of FIG. 5 and illustrating a series of air filters positioned within the housing.

FIG. 4 shows a side view of the aircraft 102 of FIGS. 2-3 and illustrating the upper wall 226 and the lower wall 228 of the housing 202 including a series of air filters 250 protruding into the air path 266 (FIG. 6). The housing 202 may have a housing height 222 which may be described as the vertical distance between the upper wall 226 and the lower wall 228. In some examples, the housing height 222 maybe up to several meters or more. In some examples, a filter surface may have a height of up to one meter or more as measured from the upper wall 226 or the lower wall 228 from which the air filter 250 extends.

The housing 202 may have a housing depth 220 which may be described as the horizontal distance from the forward end 210 of the housing 202 to the aft end 212 of the housing 202. The housing depth 220 may be up to ten meters or more. In some examples, the housing depth 220 may allow for the mounting of at least one air filter 250 in the housing interior 224. However, the housing depth 220 may be of any size, without limitation. The housing length 218 (FIG. 3) may be greater than the housing depth 220. The housing depth 220 may be greater than the housing height 222 when the housing 202 is viewed from the side along a direction parallel to the air path 266. However, the housing geometry may be such that any one of the housing length 218, the housing depth 220, and the housing height 222 is the longest dimension of the housing 202.

In FIG. 4, the housing 202 may be directly coupled to the wings 106 and/or to the fuselage 104 of the aircraft 102. For example, the aircraft 102 may include one or more housing supports 206. Each housing support 206 may couple the housing 202 to the wings 106 such as at the location of the propulsion units 108 or at another location along the wings 106. In the example shown, a housing support 206 may include a system of pylons or struts 208 to couple the housing 202 to the aircraft 102. The housing 202 may also be coupled to the fuselage 104 such as at a forward end of the fuselage 104. However, the housing 202 may be attached to the aircraft 102 at any location. For example, although not shown, a housing 202 may be mounted in spaced relation above the wings 106. In a further example, a housing 202 may be mounted to the empennage 112.

Figure 7:
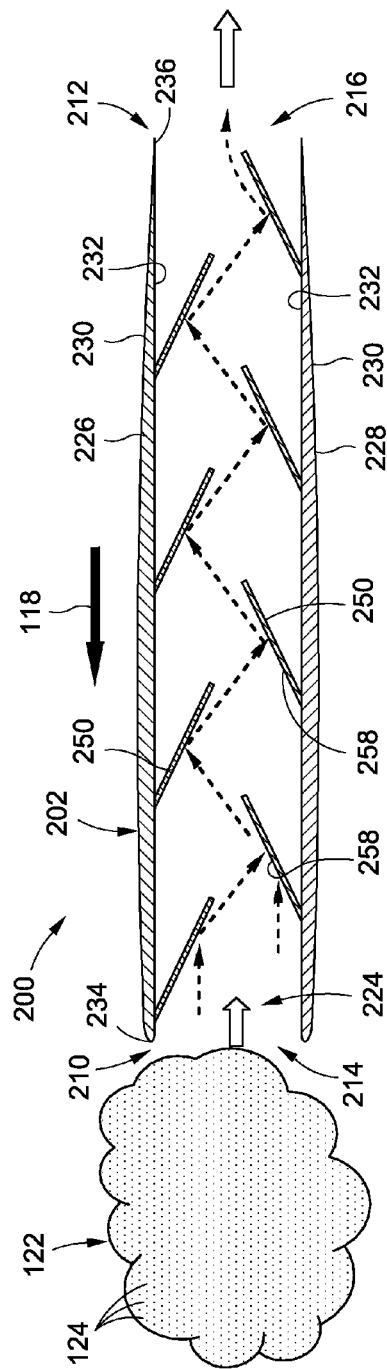
FIG. 7 is a side view of the air filter bank of FIG. 6 showing a volume of air entering the air intake prior to impinging on the filter surfaces for removal of pollutants.

Although the presently-disclosed air filter bank 200 is described in the context of a tube-and-wing 106 aircraft 102 as shown in FIG. 2-4, the air filter bank 200 may be implemented on any type of manned or unmanned air vehicle 100 including, but not limited to, blended-wing aircraft, airships or dirigibles, balloons, or any other type of air vehicle 100, without limitation, configured to move one or more air filter banks 200 in a forward direction through the atmosphere for removing pollutants 124 (FIG. 7). Furthermore, any one of the air vehicles 100 may be propelled by any type of propulsion system which may be powered by any type a power source, without limitation, and is not limited to the propeller-driven propulsion units 108 shown in FIG. 2-4.

The housing 202 may oriented such that the air intake 214 is facing the direction of forward motion 118 of the aircraft 102. In this regard, the housing 202 may be configured such that the air path 266 is generally aligned with a direction of forward motion 118 of the aircraft 102. The air filter bank 200 may include at least one air filter 250 extending from the lower wall 228 and/or from the upper wall 226. The air filters 250 may include filter surfaces 258 configured for removing pollutants 124 from a volume of air 122 passing through the housing 202 prior to the discharge of the volume of air out of the air exit 216 at the aft end 212 of the housing 202.

FIG. 5 is a partial perspective view of an example of an air filter bank 200. As mentioned above, the housing 202 may be divided into housing sections 204. Each one of the housing sections 204 may include an upper wall 226 and a lower wall 228 and one or more divider walls 240. Two or more housing sections 204 may be joined end-to-end to form a complete housing 202 of an air filter bank 200 (e.g., see FIGS. 2-3). Regardless of whether the housing 202 is provided as a single unit or assembled from end-to-end housing sections 204, the housing 202 may include a plurality of air filters 250 extending into the air path 266 for removing pollutants 124 (FIG. 7) from a volume of air 122 (FIG. 7) passing through the housing interior 224. Although not shown, an air filter bank 200 may also be provided in an implementation where two or more housings 202 or housings 202 sections are vertically stacked on top of one another.

FIG. 6 is a side view of an example of the air filter bank 200 of FIG. 5. The upper wall 226 and the lower wall 228 may have a rounded forward edge 234 and a tapered aft edge 236 to reduce aerodynamic drag of the housing 202. The outer surfaces 230 of the upper wall 226 and lower wall 228 may be slightly rounded such that the upper wall 226 and/or lower wall 228 have a slender airfoil shape. The slender airfoil shape of the upper and lower wall 226, 228 may facilitate efficient airflow over the outer surfaces 230 such that the airflow remains attached to avoid flow separation and minimize aerodynamic drag of the housing 202.

FIG. 6 shows a series of air filters 250 positioned within the housing 202. As indicated above, at least one or more air filters 250 may extend from the upper wall 226 and/or the lower wall 228. For example, one or more air filters 250 may extend downwardly from the inner surface 232 of the upper wall 226. One or more air filters 250 may extend upwardly from the inner surface 232 of the lower wall 228. The air filters 250 may have a free edge 254 extending into the air path 266. In some examples, the housing 202 may allow for at least two of the air filters 250 on the lower wall 228 and at least two of the air filters 250 on the upper wall 226. Although not shown, an air filter bank 200 may include air filters 250 extending from only the upper wall 226 or air filters 250 extending from only the lower wall 228, and the remaining wall may be devoid of air filters 250.

In the example shown, the air filters 250 on the upper wall 226 and/or the air filters 250 on the lower wall 228 may be longitudinally spaced apart from one another. For example, the longitudinal location of the free edge 254 of one of the air filters 250 on the upper wall 226 and/or the lower wall 228 may be located forward of the longitudinal location of the mounted edge 252 of an adjacent air filter 250 on the respective upper wall 226 and/or lower wall 228, and which may provide a horizontal gap 262 between the adjacent pair of air filters 250 on the same wall 226, 228. In addition, the air filter bank 200 may be configured such that an adjacent pair of air filters 250 on the upper wall 226 and/or the lower wall 228 may be spaced apart from one another at a filter spacing 260 which may be described as the distance between the free edges 252 of adjacent air filters 250. The filter spacing 260 may be greater than the horizontal distance between a mounted edge 252 and a free edge 254 of an air filter 250. The filter spacing between adjacent air filters may allow the volume of air passing through the housing interior to contact a full height of each one of the filter surfaces 258 as the air cascades off of each air filter 250 in the series from the forward end 210 to the aft end 212 of the housing 202.

The air filters 250 extending downwardly from the upper wall 226 may be horizontally staggered in relation to the air filters 250 extending upwardly from the lower wall 228. In this regard, the air filters 250 may be staggered such that a free edge 254 of an air filter 250 extending downwardly from the upper wall 226 is approximately longitudinally midway between the free edges 254 of a pair of air filters 250 extending upwardly from the lower wall 228. However, the air filter bank 200 may be provided in an implementation wherein the air filters 250 extending from the upper wall 226 are generally longitudinally aligned with the air filters 250 extending from the lower wall 228.

In some examples, the air filters 250 may be configured to provide a vertical gap 264 between the free edges 254 of the air filters 250 of the upper wall 226 and the free edges 254 of the air filters 250 of the lower wall 228. In this regard, the air filters 250 extending from the upper wall 226 and lower wall 228 may be arranged to allow for direct line-of-sight through the housing interior 224 along the air path 266 from the air intake 214 to the air exit 216. The direct line-of-sight may reduce the amount of aerodynamic drag generated by the volume of air impinging on the series of air filters 250. However, the air path 266 may be a tortuous path without line-of-sight between the air intake 214 and the air exit 216.

The filter surfaces 258 on at least one wall (e.g., on the upper wall 226 or the lower wall 228) may all have the same filter height 256. Alternatively, the filter surfaces 258 on at least one wall 226, 228 may have filter heights 256 that vary. For example, the filter surfaces 258 on one wall at the forward end 210 may have a reduced filter height 256 relative to the filter height 256 of the filter surfaces 258 on the same wall at the aft end 212 of the housing 202. The filter heights 256 may gradually increase from the forward end 210 to the aft end 212 to minimize aerodynamic drag and/or to maximize the pollutant-removing capability of the filter surfaces 258 of a series of air filters 250.

In some examples, the filter surfaces 258 may be oriented non-parallel to the air path 266. For example, one or more of the filter surfaces 258 may be oriented perpendicular to the air path 266. FIG. 5 illustrates the filter surfaces 258 configured as planar slats oriented perpendicular to the air path 266 which, as indicated above, is generally parallel to the direction of forward motion 118 of the air vehicle 100. In other examples, the filter surfaces 258 may be oriented non-perpendicularly relative to the air path 266. In addition, any one or more of the filter surfaces 258 may have a non-planar configuration, and are not limited to the planar configuration shown in the Figures. For example, a filter surface may have a concave profile, a convex profile, or other profiles when viewed from the side.

Referring still to FIG. 6, at least one of the filter surfaces 258 may be oriented at a non-perpendicular filter surface angle relative to the air path 266 when the filter surface is viewed from a side. In this regard, one or more of the filter surfaces 258 may be angled in an aft direction or slanted direction relative to the direction of forward motion 118 (FIG. 4) of the aircraft 102. The aft angled or slanted orientation of the filter surfaces 258 may reduce the amount of aerodynamic drag generated by the volume of air 122 impinging on the filter surfaces 258.

FIG. 7 shows the air filter bank 200 of FIG. 6 and a volume of air 122 entering the air intake 214. As indicated above, the volume of air 122 may be obtained from a region of the atmosphere containing pollutants. Due to the forward motion 118 of the air vehicle 100, the volume of air 122 may enter the air intake 214 and may impinge on the filter surfaces 258. For example, a volume of air 122 may impinge or bounce off of the series of filter surfaces 258 in a cascading manner as the volume of air 122 moves through the housing interior 224 prior to exiting the air exit 216. The filter surfaces 258 may be configured to collect pollutants 124 as the volume of air 122 is deflected off of the filter surfaces 258.

The air filters 250 may be configured to remove one or more types of pollutants 124 from the volume of air 122 prior to discharge of the volume of air 122 at the air exit 216. Any one or more of the air filters 250 may be configured to remove pollutants 124 in solid, liquid, and/or gaseous form. In one implementation, at least one of the filter surfaces 258 may configured as an electrostatic filter configured to capture and retain particulates entrained in the volume of air 122 impinging on the filter surfaces 258. In addition, one or more of the air filters 250 may be configured to capture and retain particulates of a specific size. The air filters 250 may be provided with a specific charge (e.g., negative or positive) to capture a specific type of particulate. In another example, one or more of the filter surfaces 258 may be configured as a chemical filter for or capturing and retaining noxious gases. For example, one or more of the air filters 250 may be a chemical filter activated with charcoal and configured for capturing and retaining noxious gases. In still other examples, a filter surface 258 may be configured as a combination of an electrostatic filter and chemical filter for filtering both particles and gasses.

As indicated above, pollutants 124 in the air may include noxious gases (e.g., gas molecules of such noxious gasses) including, but not limited to, oxides of sulfur and nitrogen, carbon monoxide, ozone, and other gasses generated by the burning of hydrocarbons. In some examples, one or more of the filter surfaces 258 may be provided with a surface treatment or a coating configured to filter or remove one or more types of pollutants 124 from the air.

One or more of the air filters 250 may also be configured to repel moisture (e.g., water droplets) entrained within the air. In some examples, one or more of the air filters 250 may be provided with a hydrophobic coating to allow the air filters 250 to repel moisture and extract and retain the particulate (e.g., a soot particle) formerly surrounded by a water droplet. One or more of the air filters 250 may be configured to capture and retain particulates from volcanoes, forest fires, mining operations, dust storms, power plants such as coal-burning plants, and other particulate sources.

An air filter bank 200 may include different types of air filters 250 configured to remove different types of pollutants 124 from a volume of air 122 passing through the air filter bank 200. For example, the air filter bank 200 may include one or more air filters 250 configured to remove certain types of gasses, another type of air filter 250 configured to remove particulates, and/or a still further type of air filter 250 configured to remove certain types of liquids from the volume of air 122 passing through the air filter bank 200. As indicated above, the volume of air 122 may be deflected off of the series of air filters 250. Each air filter 250 may remove a portion of the pollutants 124 entrained in the volume of air 122. The filter surfaces 258 may be configured to remove a portion (e.g., 10-90 percent) of the pollutants 124 in a volume of air 122 moving from the air intake 214 to air exit.

Figure 8:
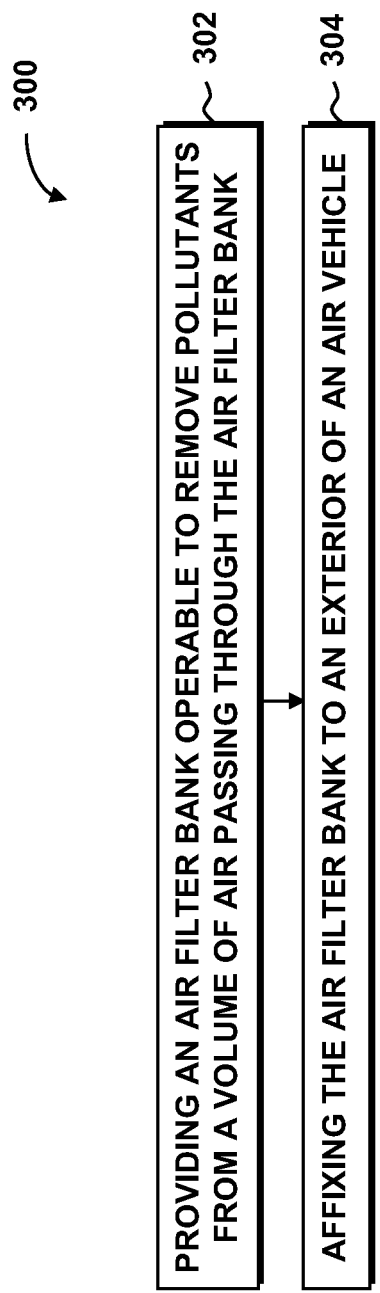
FIG. 8 is a flowchart illustrating one or more operations that may be included in a method for manufacturing an air vehicle for removing pollutants from a volume of air.

FIG. 8 is a flowchart illustrating one or more operations that may be included in a method 300 of manufacturing an air vehicle 100 for removing pollutants 124 from a volume of air 122. Step 302 of the method 300 may include providing an air filter bank 200 operable to remove pollutants 124 from a volume of air 122 passing through the air filter bank 200. As indicated above, the air filter bank 200 may include a housing 202 coupled to the air vehicle 100 and having an air intake 214 at a forward end 210 and an air exit 216 at an aft end 212 and defining an air path 266 therebetween. The air filter bank 200 may include at least one air filter 250 positioned within the housing 202 along the air path 266. For example, the air filter bank 200 may include a series of air filters 250 arranged in spaced relation to one another along a direction of the air path 266.

As shown in FIGS. 5-7, the air filter bank 200 may include one or more air filters 250 extending downwardly from the inner surface 232 of an upper wall 226 and one or more air filters 250 extending upwardly from the inner surface 232 of a lower wall 228. The air filters 250 mounted to the upper wall 226 may be horizontally staggered in relation to the air filters 250 mounted to the lower wall 228. The air filters 250 may be configured to provide line-of-sight to the housing 202 to reduce the amount of aerodynamic drag generated by the volume air passing along the air path 266 from the air intake 214 to the air exit 216. However, the air filters 250 may be arranged such that the volume of air 122 is forced to follow a tortuous path (not shown) through the housing interior 224 from the air intake 214 to the air exit 216.

The air filter bank 200 may be configured to be modular to simplify assembly and transportation of the filter bank 200. Modularity of the filter bank 200 may also facilitate the removal, repair, and/or replacement of components of the air filter bank 200. For example, the air filter bank 200 may include a housing 202 that may be provided in a modular arrangement of a plurality of housing sections 204 as shown in FIGS. 2-3. The housing sections 204 may be assembled to form an air filter bank 200 of a desired length based on the size of the air vehicle that is intended to carry the air filter bank 200.

An air filter bank 200 may also be configured to facilitate assembly and removal of individual air filters 250 from the housing 202. For example, the upper and/or lower wall 226, 228 may be configured to facilitate the replacement of individual air filters 250 such as on a periodic maintenance basis or to replace damaged air filters 250. For example, the upper mold and/or lower wall 226, 228 may be provided with slots or grooves (not shown) that may be sized and configured to receive the mounted edges 252 of the air filters 250 to allow for manually sliding worn or damaged air filter 250 in and out of the grooves. Modularity of the air filters 250 may also facilitate the configuring of the air filter bank 200 for specific types of pollutants 124 to be removed from the atmosphere at a given geographic location. For example, air filters 250 configured for removing noxious gases from the atmosphere may be replaced with air filters 250 configured for removing air pollution comprised predominately of particulates such as soot.

Step 304 of the method 300 may include affixing the air filter bank 200 to an exterior of an air vehicle 100. In the example shown in FIGS. 2-3, the air filter bank 200 may include an elongated housing 202 which may be supported by one or more housing supports 206 extending between the wings 106 and the housing 202. A housing 202 may additionally be coupled to the fuselage 104 or to other location on an air vehicle 100. As may be appreciated, an air vehicle 100 may include one or more air filter banks 200 mounted to the exterior of an aircraft 102. As indicated above, one or more air filter banks 200 may be attached to the air vehicle 100 in any one of a variety of different locations, and is not limited to being supported below the wings 106.

An air filter bank 200 may be coupled to an air vehicle 100 in a manner that facilitates rapid assembly and disassembly of the air vehicle 100. In this regard, the construction of the air filter bank 200 and the air vehicle 100 is preferably modular to facilitate disassembly of the air filter bank 200 and the air vehicle 100 for shipping to another geographic location. In addition, the air filter bank 200 and the air vehicle 100 are preferably constructed of relatively low-cost and low-weight materials and may be assembled using low-cost manufacturing processes.

Figure 9:
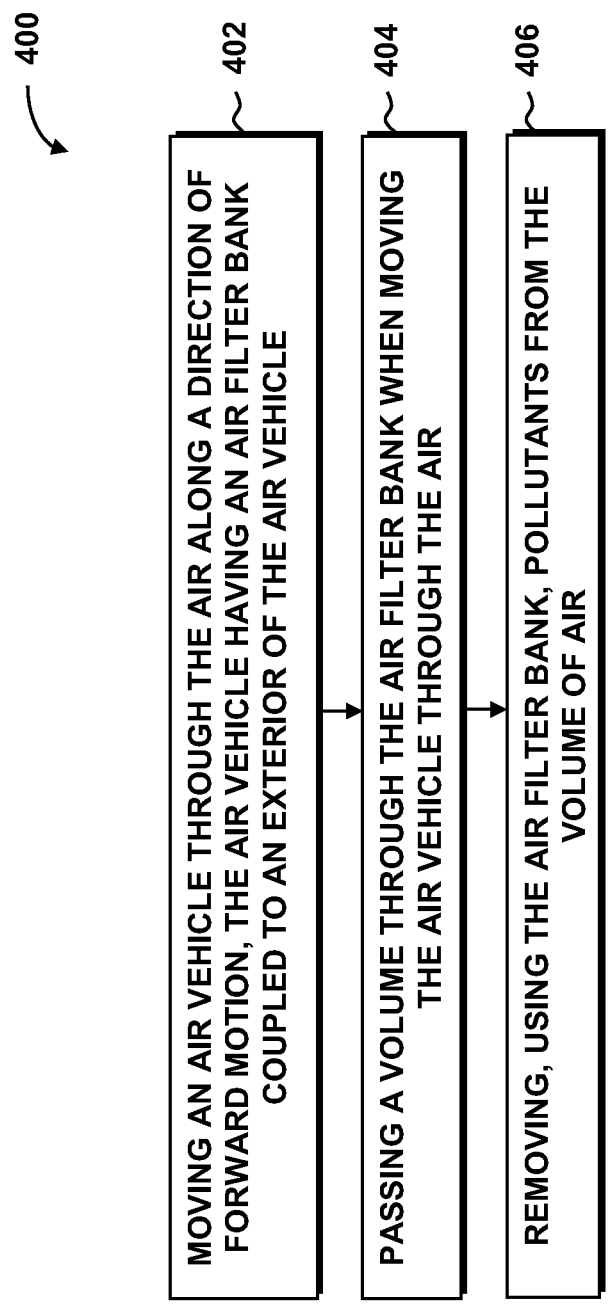
FIG. 9 is a flowchart illustrating one or more operations that may be included in a method of removing pollutants from a volume of air.

FIG. 9 is a flowchart illustrating one or more operations that may be included in a method 400 of removing pollutants 124 from a volume of air 122. Step 402 of the method 400 may include moving an air vehicle 100 through the atmosphere along a direction of forward motion 118. For example, an air vehicle 100 may fly through a cloud of air pollution located above a congested area such as a city. The air vehicle 100 may have an air filter bank 200 coupled to an exterior of the air vehicle 100. As described above, the air filter bank 200 may include an air intake 214 facing a direction of forward motion 118 of the air vehicle 100. The air filter bank 200 may include a housing 202 having one or more air filters 250.

Each one of the air filters 250 may have at least one air filter surface 258. For example, an air filter bank 200 may have a series of air filters 250 arranged in spaced relation to one another along a direction of an air path 266 through the housing 202 from the air intake 214 at the forward end 210 of the housing 202 to the air exit 216 at the aft end 212 of the housing 202. In some examples, the air filters 250 may be configured as slats, each of which may have a free edge 254 protruding into the air path 266 extending. However, as indicated above, the air filters 250 may be provided in any one of a variety of sizes, shapes, and configurations, without limitation.

Step 404 of the method 400 may include passing a volume of air 122 through the air filter bank 200 when moving the air vehicle 100 through the atmosphere. In this regard, the method may include operating one or more air vehicles 100 at a predetermined altitude and causing a volume of air 122 to enter the air intake 214 of the air filter bank 200. The method may further include impinging the volume of air 122 on one or more filter surfaces 258 in the housing 202.

Step 406 of the method 400 may include removing, using the air filters 250, pollutants 124 from the volume of air 122. As indicated above, the volume of air 122 may move along an air path 266 and may impinge on a series of filter surfaces 258. The filter surfaces 258 may remove pollutants 124 from the air impinging on the filter surfaces 258. The filter surfaces 258 may capture and retain pollutants 124 entrained in the volume of air 122 after which the volume of air 122 may be discharged from the housing 202 at the air exit 216.

Referring to FIGS. 10-11, shown is an example of a plurality of air vehicles 100 flying in formation 120 for removing pollutants 124 from the atmosphere above a city. In this regard, the present disclosure contemplates the operation of one or more air vehicles 100 at one or more predetermined altitudes or range of altitudes to remove pollutants 124 from the atmosphere over a specific geographic area. In some examples, the air vehicles 100 may be unmanned air vehicles 100 carrying air filter banks 200. The air vehicles 100 may be operated to fly in formation 120 at one or more altitudes containing high concentrations of pollutants 124. For example, in the event of an inversion layer, one or more of air vehicles 100 may be operated at or immediately below the inversion layer (e.g., within several 100 feet) to filter pollutants 124 that may be suspended in a cloud of air pollution 126. A fleet of the air vehicles 100 may make passes at several different altitudes where concentrations of pollutants 124 are highest.

The method may include moving a fleet of air vehicles 100 (FIG. 10) through the air, and collecting and removing one or more types of pollutants 124 (FIG. 11) from a volume of air 122 (FIG. 11) passing through the air filter banks 200 as the air vehicles 100 fly through the atmosphere. Such air vehicles 100 may be operated in a routine manner and/or on an emergency basis to remove pollutants 124 from the atmosphere. For example a fleet of unmanned air vehicles 100 may be deployed on routine (e.g., daily) flights over a city to maintain air quality above a predetermined standard. A fleet of solar-powered unmanned air vehicles 100 may fly during daylight hours and may land when sunlight is not available. Maintenance operations such as air filter 250 changes and battery charging may be performed at night or when sunlight levels are low. However, the air vehicles 100 may be operated substantially continuously including at night by using rechargeable batteries or by activating a small gasoline engine that may be carried by the air vehicles 100.

The air vehicles 100 may fly in formation 120 (FIGS. 10 and 11) in a predetermined flight pattern. For example, air vehicles 100 may fly an elliptical orbit or circular orbit around a predetermined point such as a prominent building or a geographic landmark. Alternatively, a fleet of unmanned air vehicles 100 may fly in a serpentine pattern at one or more predetermined altitudes to capture and retain pollutants 124 in the atmosphere. Advantageously, such air vehicles 100 may be configured to operate from remote runways and may dispense with the need to operate from a paved runway or require a control tower for takeoff and landing instructions. Each one of the air vehicles 100 made have simple guidance and navigation equipment. For example, navigational control of an air vehicle 100 may be performed with the use of an on-board GPS system, a camera, and an RF transceiver beacon.

Air vehicles 100 may be operated over congested areas such as large cities to reduce smog which may become trapped below an inversion layer. In addition, air vehicles 100 may be operated over strip mining operations, tar sand oil extraction operations, and any other industrial operation where volatile pollutant species and particulates may be generated. In addition, air vehicles 100 may be operated over events such as forest fires and volcanic events to reduce the number of particulates that may drift into urban areas or into commonly-used flight paths of commercial airliners. Air vehicles 100 may also be operated in developing countries which tend to produce relatively high levels of pollutants in the atmosphere above highly populated cities As mentioned above, the air vehicles 100 may be provided with relatively large, high aspect ratio wings 106 to provide a relatively high lift-to-drag ratio at preferably low airspeeds. For example, the air vehicles 100 may have operating airspeeds of 100 kilometers per hour (km/h) or less, and may be configured to fly in relatively calm and/or low-wind conditions to enable the use of relatively lightweight and aerodynamically-efficient airframes requiring relatively low amounts of propulsive power (e.g., thrust). Air vehicles 100 may be flown in a predetermined pattern at relatively low altitudes to minimize interference with local airport traffic. The air vehicles 100 may be operated in an autonomous or in a semi-autonomous manner following a predetermined flight path or pattern.

FIG. 12 is a chart illustrating approximate dimensions for two (2) examples of an air filter bank 200 that may be carried by one or more air vehicles 100 in a fleet for filtering the atmosphere above a city. In Example 1, the housing 202 has a housing height 222 of 3 meters and a housing length 218 of 80 meters resulting in an area of the air intake 214 of 240 square meters. At an air speed of approximately $7.50 \times 10^4$ meters/hour (e.g., 75 km/h), each air filter bank 200 may provide a filtering rate of approximately $1.80 \times 10^7$ cubic meters/hour. For ten (10) hours of operation, the air filter bank 200 in Example 1 may filter a volume of air of approximately $1.80 \times 10^8$ cubic meters. A fleet of ten (10) air vehicles 100 each carrying one of the above-described air filter banks 200 may filter a volume of air of approximately $1.80 \times 10^9$ cubic meters. For a city with an area of approximately $2.25 \times 10^8$ square meters (e.g., approximately 100 square miles) and for an altitude band of 500 meters (e.g., approximately 1500 feet), the total volume of air to be filtered is approximately $1.13 \times 10^{11}$ cubic meters. Ten (10) air vehicles 100 each having an air filter bank 200 with the above-noted filtering capability may filter approximately 1.6 percent of the total volume of air over the city.

In Example 2, the housing 202 has a housing height 222 of 4 meters and a housing length 218 of 100 meters resulting in an area of the air intake 214 of 400 square meters. At an air speed of approximately $1.00 \times 10^5$ meters/hour (e.g., 100 km/h), each air filter bank 200 may provide a filtering rate of approximately $4.80 \times 10^7$ cubic meters/hour. For 12 hours of operation, the air filter bank 200 in Example 2 may filter a volume of air of approximately $4.80 \times 10^8$ cubic meters. A fleet of 20 air vehicles 100 each carrying one of the above-described air filter banks 200 may filter a volume of air of approximately $9.60 \times 10^9$ cubic meters. For the same total volume of air over the city to be filtered as in Example 1, the fleet of 20 air vehicles 100 of Example 2 may filter approximately 8.53 percent of the total volume of air over the city.

The above-noted examples provide an indication that a fleet of air vehicles 100 may treat a portion of the air over a relatively large metropolitan area. As may be appreciated, a larger quantity of vehicles may be operated with larger filter banks to filter a greater portion of the air and provide a significant improvement in air quality. In this regard, the fleet of air vehicles 100 may be operated periodically (e.g., daily) or on an as-needed basis (e.g., when an inversion layer is present) to maintain the buildup of pollutants (e.g., particulates) below a critical level.

Additional modifications and improvements of the present disclosure may be apparent to those of ordinary skill in the art. Thus, the particular combination of parts described and illustrated herein is intended to represent only certain implementations of the present disclosure and is not intended to serve as limitations of alternative embodiments or devices within the spirit and scope of the disclosure.

What is claimed is:

1. An air filter bank, comprising:
   a housing configured to be coupled to an exterior of an air vehicle, the housing having a housing interior defined by an upper wall, a lower wall, and an air intake at a forward end and an air exit at an aft end and defining an air path therebetween;
   a series of air filters extending downwardly from the upper wall and a series of air filters extending upwardly from the lower wall, each one of the air filters having a free edge extending into the air path;
   the series of air filters on the upper wall arranged in horizontally staggered relation to the series of air filters on the lower wall in a manner causing a volume of air entering the air intake to impinge off of the filter surfaces in a cascading manner as the volume of air moves through the housing interior prior to exiting the air exit during forward motion of the air vehicle; and
   the air filters each having a filter surface configured to remove pollutants entrained in the volume of air moving through the housing interior.

2. The air filter bank of claim 1, wherein:
   the filter surface is oriented non-parallel to the air path.

3. The air filter bank of claim 1, wherein:
   the filter surface is oriented at a non-perpendicular filter surface angle relative to the air path when the filter surface is viewed from a side.

4. The air filter bank of claim 1, wherein:
   the filter surface is configured as an electrostatic filter, a chemical filter activated with charcoal, or a combination thereof.

5. The air filter bank of claim 1, where:
   the housing has a housing length oriented substantially perpendicular to a direction of forward motion of the air vehicle.

6. An air vehicle, comprising:
   at least one air filter bank coupled to an exterior of the air vehicle, the air filter bank including:
      a housing configured to be coupled to an exterior of an air vehicle, the housing having a housing interior defined by an upper wall, a lower wall, and an air intake at a forward end and an air exit at an aft end and defining an air path therebetween;
      a series of air filters extending downwardly from the upper wall and a series of air filters extending upwardly from the lower wall, each one of the air filters having a free edge extending into the air path;
      the series of air filters on the upper wall arranged in horizontally staggered relation to the series of air filters on the lower wall in a manner causing a volume of air entering the air intake to impinge off of the filter surfaces in a cascading manner as the volume of air moves through the housing interior prior to exiting the air exit during forward motion of the air vehicle; and the air filters each having a filter surface operable to remove pollutants from the volume of air passing through the housing interior during forward motion of the air vehicle.

7. The air vehicle of claim 6, wherein:
the housing has a housing length oriented substantially perpendicular to a direction of forward motion of the air vehicle.

8. The air vehicle of claim 6, wherein:
the air vehicle includes one or more propulsion units powered by at least one of the following: solar cells, a battery, fuel cells, an internal combustion engine, a gas turbine engine, and combinations thereof.

9. A method of manufacturing an air vehicle for removing pollutants from a volume of air, comprising:
providing an air filter bank including:
a housing having a housing interior defined by an upper wall, a lower wall, and an air intake at a forward end and an air exit at an aft end and defining an air path therebetween;
a series of air filters extending downwardly from the upper wall and a series of air filters extending upwardly from the lower wall, each one of the air filters having a free edge extending into the air path;
the series of air filters on the upper wall arranged in horizontally staggered relation to the series of air filters on the lower wall in a manner causing a volume of air entering the air intake to impinge off of the filter surfaces in a cascading manner as the volume of air moves through the housing interior prior to exiting the air exit during forward motion of the air vehicle; and
affixing the housing to an exterior of an air vehicle.

10. The method of claim 9, wherein:
the housing has a housing length oriented substantially perpendicular to the direction of forward motion of the air vehicle.

11. A method of removing a pollutant from a volume of air, comprising:
moving an air vehicle through the air along a direction of forward motion, the air vehicle having an air filter bank coupled to an exterior of the air vehicle, the air filter bank including:
a housing configured to be coupled to an exterior of an air vehicle, the housing having a housing interior defined by an upper wall, a lower wall, and an air intake at a forward end and an air exit at an aft end and defining an air path therebetween;
a series of air filters extending downwardly from the upper wall and a series of air filters extending upwardly from the lower wall, each one of the air filters having a free edge extending into the air path, the series of air filters on the upper wall arranged in horizontally staggered relation to the series of air filters on the lower wall;
passing a volume of air through the air filter bank when moving the air vehicle through the air;
impinging the volume of air off of the filter surfaces in a cascading manner as the volume of air moves through the housing interior prior to exiting the air exit during forward motion of the air vehicle; and
removing, using the filter surfaces, pollutants from the volume of air cascading off of the filter surfaces.

12. The method of claim 11, wherein:
the housing has a housing length oriented substantially perpendicular to a direction of forward motion of the air vehicle.

13. The method of claim 11, wherein the step of moving the air vehicle through the air includes:
moving a fleet of the air vehicles through the air; and
at least some of the air vehicles having an air filter bank configured to collect and remove a pollutant from a volume of air passing through the air filter bank.

* * * * *